US012724419B2

(12) United States Patent
Whelan et al.

(10) Patent No.: US 12,724,419 B2
(45) Date of Patent: Sep. 1, 2026

(54) ARCHITECTURE FOR AUTONOMOUS SCHOOL SAFETY ROBOTS WITH BEHAVIOR REINFORCEMENT

(71) Applicant: RedCritter Corp., Flower Mound, TX (US)

(72) Inventors: Randy M. Whelan, Coppell, TX (US); Erika D. Lambert, Flower Mound, TX (US); Robert M. Beaty, Flower Mound, TX (US); James L. Rockett, Jr., Carrollton, TX (US); Clyde H. Forland, III, Dallas, TX (US)

(73) Assignee: RedCritter Corp., Flower Mound, TX (US)

( * ) Notice: Subject to any disclaimer, the term of this patent is extended or adjusted under 35 U.S.C. 154(b) by 119 days.

(21) Appl. No.: 18/909,718

(22) Filed: Oct. 8, 2024

(65) Prior Publication Data

US 2026/0099144 A1 Apr. 9, 2026

(51) Int. Cl.
*G05D 1/229* (2024.01)
*G05D 101/10* (2024.01)
(Continued)

(52) U.S. Cl.
CPC ....... *G05D 1/2297* (2024.01); *G05D 2101/10* (2024.01); *G05D 2105/70* (2024.01); *G05D 2105/85* (2024.01); *G05D 2107/63* (2024.01); *G05D 2111/10* (2024.01); *G05D 2111/20* (2024.01)

(58) Field of Classification Search
CPC .... G05D 1/0011; G05D 1/0016; G05D 1/229; G05D 1/2297; G05D 1/648; G05D 2101/10; G05D 2109/10; G05D 2105/70; G05D 2105/85; G05D 2107/60; G05D 2107/63; G05D 2111/10; G05D 2111/20; G06V 20/44; G06V 20/52; G06V 40/10; G06V 40/16; G06V 40/172; G06V 40/173
See application file for complete search history.

(56) References Cited

U.S. PATENT DOCUMENTS

2021/0048829 A1* 2/2021 Deyle .................. G05D 1/0274

FOREIGN PATENT DOCUMENTS

| | | | | |
|---|---|---|---|---|
| CN | 109333563 A | * | 2/2019 | .............. B25J 5/007 |
| CN | 118061199 A | * | 5/2024 | ........... G06Q 50/265 |
| KR | 101861097 B1 | * | 5/2018 | ........... G06Q 50/205 |

OTHER PUBLICATIONS

English translation of CN109333563 (Year: 2019).*
English translation of CN118061199 (Year: 2024).*
English translation of KR101861097 (Year: 2018).*

* cited by examiner

*Primary Examiner* — Brandon Z Willis
(74) *Attorney, Agent, or Firm* — Kirton McConkie; Brian Tucker

(57) ABSTRACT

An architecture for autonomous school safety robots with behavior reinforcement is provided. The architecture can include a management server, a management portal and a number of robots for patrolling a school environment. The management portal provides an interface for an administrator to control the robots using prompts. These prompts can describe the type of behavior, object, event, occurrence, etc. that the robots should detect and can define how the robots should respond to a detection. The management portal also provides an interface for the administrator to review and respond to any reported detection.

20 Claims, 11 Drawing Sheets

(51) Int. Cl.

| | |
|---|---|
| ***G05D 105/70*** | (2024.01) |
| ***G05D 105/85*** | (2024.01) |
| ***G05D 107/60*** | (2024.01) |
| ***G05D 111/10*** | (2024.01) |
| ***G05D 111/20*** | (2024.01) |

Management Portal 200

Active Prompts

| Prompt Name | Prompt Type | ... |
|---|---|---|
| Prompt 1 | Behavior | |
| Prompt 2 | Weapon | |
| Prompt 3 | Altercation | |
| ... | | |

Create New Prompt

Edit Existing Prompt

View Prompt Analytics

Scheduled Prompts

September

| | | | | | | |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 Prompt 1 | 28 |
| 29 | 30 Prompt 2 Prompt 3 | | | | | |

FIG. 4A

Figure 4B:
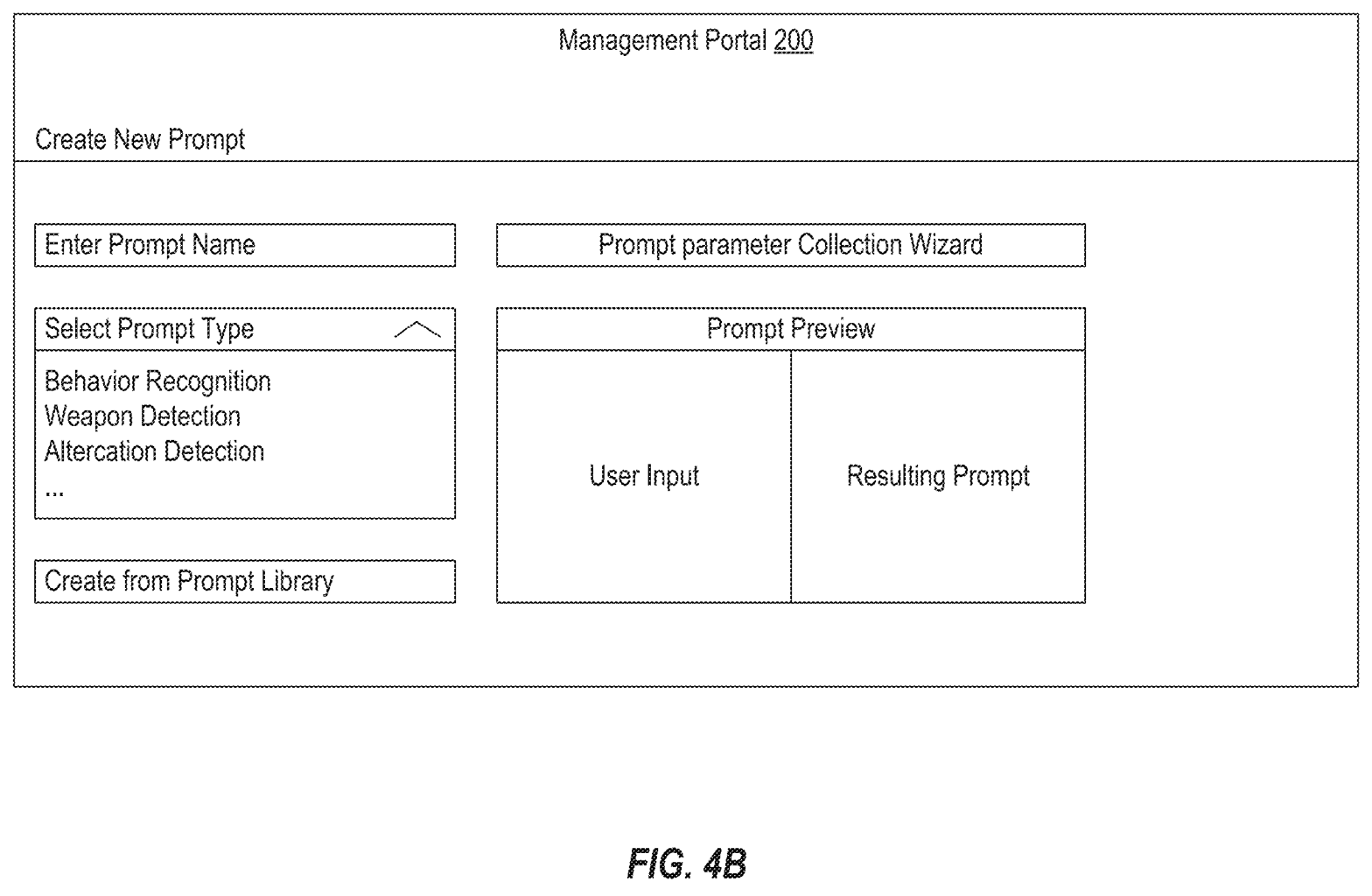

Management Portal 200

Create New Prompt

Enter Prompt Name

Select Prompt Type

Behavior Recognition
Weapon Detection
Altercation Detection
...

Create from Prompt Library

Prompt parameter Collection Wizard

Prompt Preview

User Input

Resulting Prompt

ARCHITECTURE FOR AUTONOMOUS SCHOOL SAFETY ROBOTS WITH BEHAVIOR REINFORCEMENT

CROSS-REFERENCE TO RELATED APPLICATIONS

N/A

BACKGROUND

In today's educational landscape, schools face unprecedented challenges in ensuring student safety, promoting positive behavior, and creating enriching learning environments. Traditional methods of school security often fall short, relying heavily on human monitoring which can be inconsistent and limited in scope.

BRIEF SUMMARY

Embodiments of the present disclosure are generally directed to an architecture for autonomous school safety robots with behavior reinforcement. The architecture can include a management server, a management portal and a number of robots for patrolling a school environment. The management portal provides an interface for an administrator to control the robots using prompts. These prompts can describe the type of behavior, object, event, occurrence, etc. that the robots should detect and can define how the robots should respond to a detection. The management portal also provides an interface for the administrator to review and respond to any reported detection.

In some embodiments, a method for providing autonomous robots in a school environment is provided. A management server may provide a management portal to an administrator. The management portal may receive, from the administrator, user input for defining a prompt. The prompt is associated with a first type of detectable occurrence that one or more robots are to make in the school environment. The prompt is generated based on the user input and is configured to instruct the one or more robots to patrol the school environment for the first type of detectable occurrence. The prompt is provided to one or more artificial intelligence components of the one or more robots to thereby cause the one or more robots to patrol the school environment for the first type of detectable occurrence.

In some embodiments, the first type of detectable occurrence comprises one of: a positive behavior exhibited by a student, an altercation between students, presence of a weapon, an acoustic event, or presence of an unknown individual.

In some embodiments, the prompt is generated using artificial intelligence based on the user input.

In some embodiments, the method includes receiving a detection report from a first robot of the one or more robots. The detection report indicates that the first robot detected the first type of detectable occurrence. The administrator is then notified of the detection report.

In some embodiments, the first type of detectable occurrence is a positive behavior exhibited by a student and the detection report identifies the student and includes a video snippet that captured the positive behavior.

In some embodiments, the first type of detectable occurrence is an altercation between two or more students and the detection report identifies the students and includes a video snippet that captured the altercation.

In some embodiments, the first type of detectable occurrence is presence of a weapon and the detection report includes a location of the detectable occurrence and one or more images or video of the weapon.

In some embodiments, the first type of detectable occurrence is an acoustic event and the detection report includes a location of the detectable occurrence and an audio snippet that captured the acoustic event.

In some embodiments, the first type of detectable occurrence is presence of an unknown individual and the detection report includes a location of the detectable occurrence and one or more images or video of the unknown individual.

In some embodiments, in conjunction with the administrator reviewing the detection report via the administrator portal, the administrator portal can provide an interface for the administrator to control the first robot to further evaluate the detectable occurrence.

In some embodiments, the interface for the administrator to control the first robot to further evaluate the detectable occurrence includes an option to cause the first robot to interact with an individual when the first type of detectable occurrence relates to the individual and/or an option to cause the first robot to focus a camera on the first type of detectable occurrence.

In some embodiments, it can be determined that the detection report represents a safety concern, and one or more alerts can be sent to one or more external systems.

In some embodiments, the one or more external systems comprise one or more of a communication system for communicating with students, teachers or parents, a law enforcement system, or an alarm system.

In some embodiments, content capturing the first type of detectable occurrence can be presented to the administrator. The administrator can then provide input that either confirms the first type of detectable occurrence or identifies a second type of detectable occurrence captured in the content.

In some embodiments, the content can be used to train the one or more artificial intelligence components of the one or more robots.

In some embodiments, the management server can provide a library of predefined prompts. Each predefined prompt is associated with at least one type of detectable occurrence. The administrator can select a first predefined prompt in the library. The first predefined prompt can then be sent to the one or more artificial intelligence components of at least one of the one or more robots to thereby cause the at least one of the one or more robots to patrol the school environment for the at least one type of detectable occurrence associated with the first predefined prompt.

In some embodiments, the user input for defining the prompt is received through a wizard that is based on the first type of detectable occurrence.

In some embodiments, a method for providing autonomous robots in a school environment is provided. A management server can provide a management portal to an administrator. The administrator can select, via the management portal, selection of a first prompt to be deployed to one or more robots in the school environment. The first prompt includes instructions to patrol the school environment for a first type of detectable occurrence and instructions for sending a detection report when the first type of detectable occurrence is detected. The first prompt is provided to one or more artificial intelligence components of the one or more robots to thereby cause the one or more robots to patrol the school environment for the first type of detectable occurrence. A detection report conforming to the instructions in the first prompt is received from the one or more robots and presented to the administrator via the administrator portal.

In some embodiments, the first type of detectable occurrence comprises one of: a positive behavior exhibited by a student, an altercation between students, presence of a weapon, an acoustic event, or presence of an unknown individual.

In some embodiments, an architecture for autonomous school safety robots with behavior reinforcement includes one or more robots deployed in a school environment. The one or more robots each includes a camera, a microphone, and one or more AI components by which the robot patrols the school environment based on one or more prompts. The architecture also includes a management server that provides a management portal by which an administrator creates or selects the one or more prompts to cause the one or more robots to patrol the school environment.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

These drawings depict only example embodiments and should not be considered limiting of the scope of the disclosed embodiments.

FIGS. 4A-4C provide examples of content and functionality that a management portal may provide in one or more embodiments.

DETAILED DESCRIPTION

Figure 1:
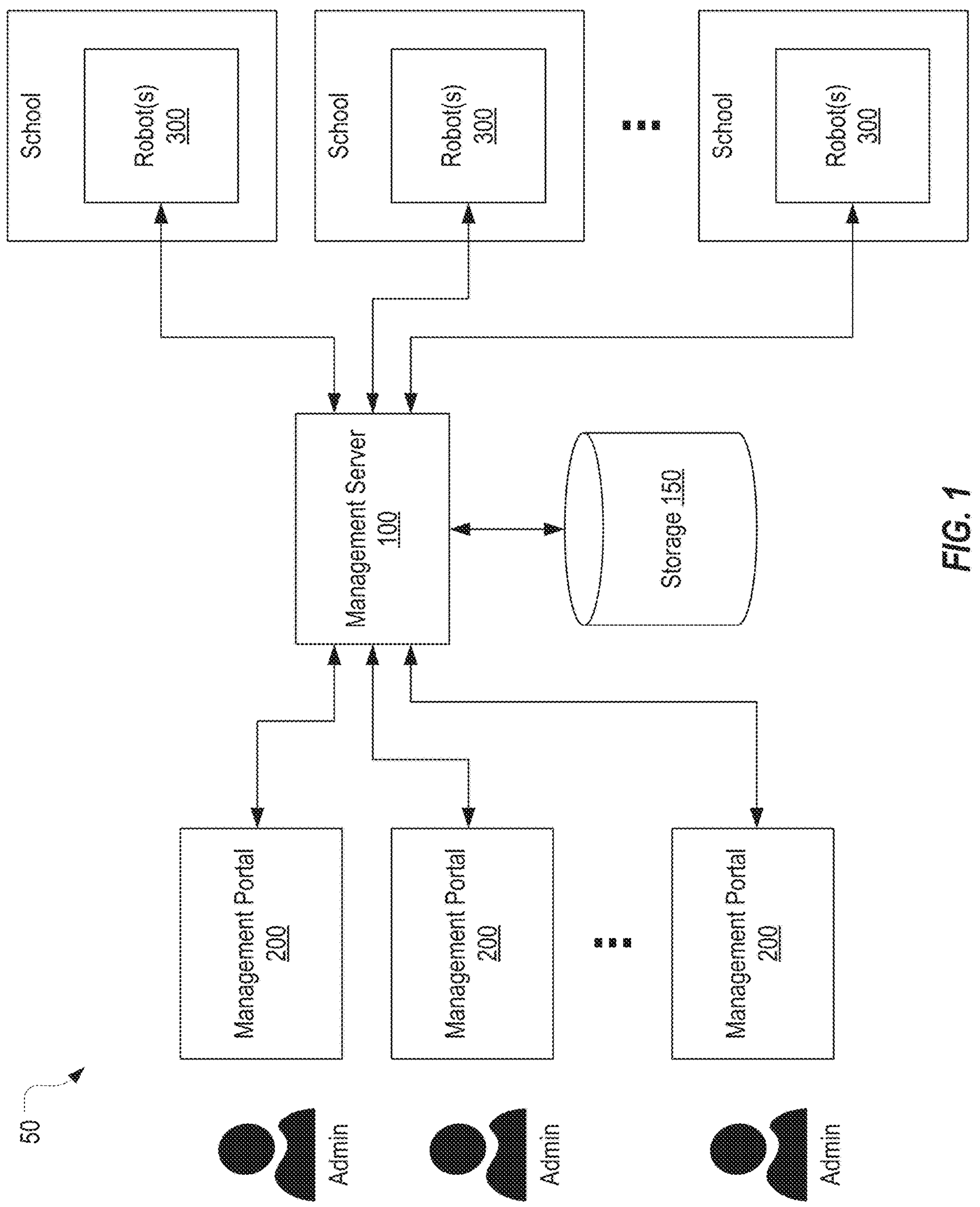
FIG. 1 illustrates an example of an architecture for autonomous school safety robots with behavior reinforcement in accordance with one or more embodiments.

FIG. 1 provides an example of an architecture for autonomous school safety robots with behavior reinforcement 50 ("architecture 50") in which one or more embodiments of the present disclosure may be implemented. Architecture 50 includes a management server 100, storage 150, a management portal 200, and one or more robots 300. In a typical implementation, one or more robots 300 may be located in each of a plurality of schools. For example, a robot 300 could be located near each entrance and/or in each common area of a school. In some embodiments, some or all of the robots 300 may be mobile and therefore capable of patrolling the school. In some embodiments, a robot 300 may be in the form of a school mascot or other character for creating a welcoming environment for students (e.g., a tiger, a bear, a knight, etc.).

Management server 100 can represent any combination of computing components for implementing the functionality described herein. For example, management server 100 could be deployed/implemented in a cloud or on a dedicated server computing device. Storage 150 can represent any suitable data storage technology in which the data described herein is maintained. For example, storage 150 could represent one or more cloud-based storage devices on which a collection of cloud-based databases and/or other data structures are maintained.

Management portal 200 can represent an interface by which an administrator interacts with management server 100. For example, management portal 200 could be a website or a dedicated application that enables an administrator to perform the functionality described herein. The term "administrator" should be construed as an individual who is authorized to access management server 100 on behalf of one or more schools such as for the purpose of interacting with the robots 300 in such schools and/or for the purpose of reviewing and responding to reports or alerts.

Figure 2:
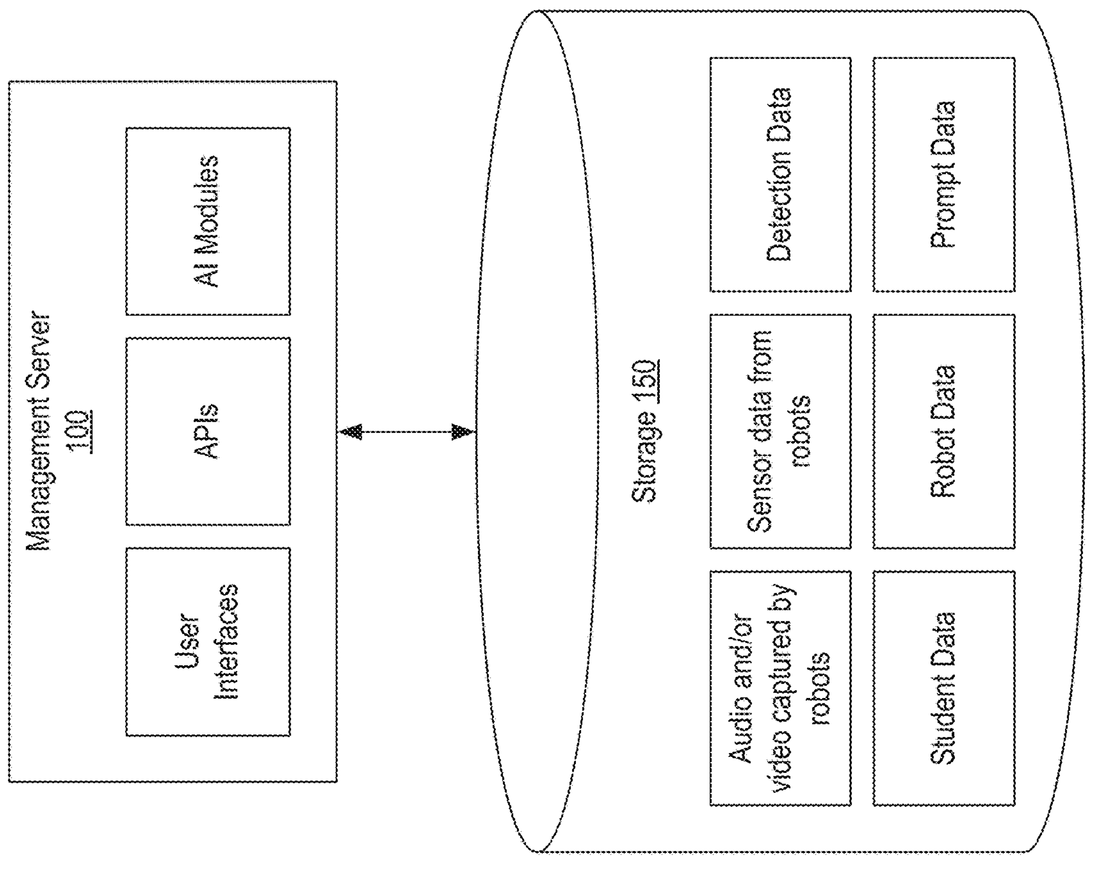
FIG. 2 illustrates an example of a management server and storage that may be used in one more embodiments.

FIG. 2 provides a general example of some components/functionality that management server 100 may include and some content/data that may be maintained in storage 150. As shown, management server 100 may provide one or more user interfaces (e.g., management portal 200), various application programming interfaces (APIs) (e.g., APIs invoked by management portal 200, APIs invoked by robots 300, APIs for integrating with school management systems, rewards systems, etc.), and artificial intelligence (AI) modules (e.g., for prompt generation as described below), among possibly other components/functionality. Management server 100 may use storage 150 to store/maintain audio and/or video captured by robots 300, sensor data received from robots 300, detection data (e.g., detected events, interactions, behaviors, individuals, items, etc. from audio, video, sensor data, etc.), student data (e.g., name, grade, schedule, images, etc. of students), robot data (e.g., ID, location, configuration settings, capabilities, etc.), and prompt data (e.g., for configuring robots 300), among possibly other data.

Figure 3:
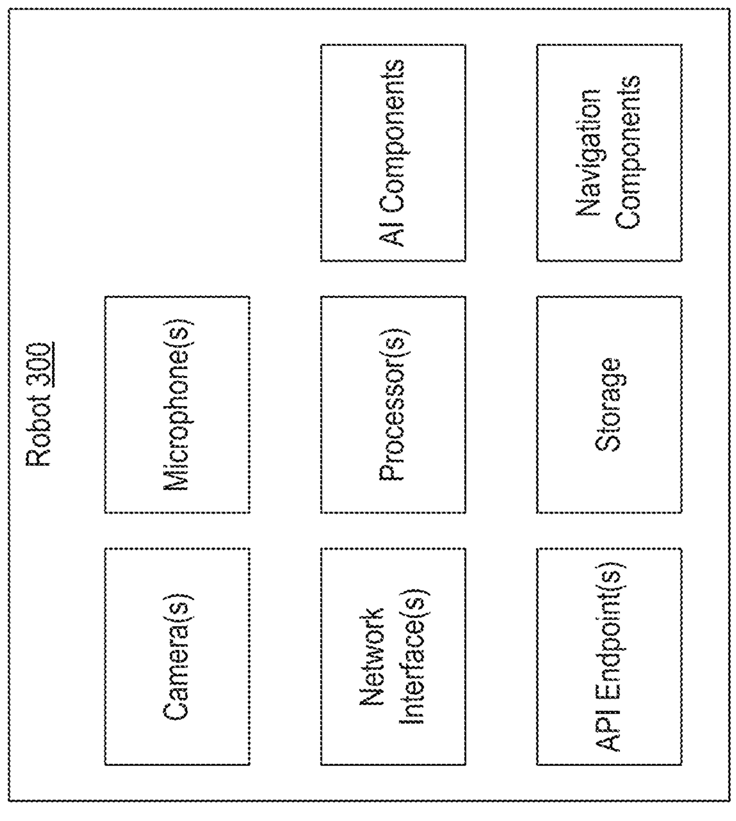
FIG. 3 illustrates example components of a robot that may be used in one or more embodiments.

FIG. 3 provides an example of components a robot 300 may have in one or more embodiments. These components are intended to generally represent any suitable hardware and/or software for performing the identified functionality. As mentioned above, in some embodiments, such components may be housed in a body resembling a school mascot or other character. However, such components could be housed in any enclosure. Also, in some embodiments, each robot 300 may have all or only some of these components.

As shown, a robot 300 may include one or more cameras for capturing images and/or video, one or more microphones for capturing audio, storage (whether local storage devices or components for accessing cloud-based storage) for storing any data, one or more AI components (e.g., software modules), one or more API endpoints (e.g., software modules for communicating with management server 100, directly with an admin/technician, etc.), one or more processors for, among other things, executing/processing the AI components, the API endpoints, the audio/video data, etc., one or more network interfaces (e.g., Wi-Fi, Ethernet, Bluetooth, etc.) for communicating with management server 100, other robot(s) 300, or other devices/systems, and navigation components for navigating a school (e.g., motor(s) for wheels, legs, etc.).

A robot 300 can include a variety of AI components and such AI components may be dependent on the robot's use case. For example, the AI components could include one or more neural networks that robot 300 implements to be able to navigate a school, to perform object recognition, to perform facial recognition, etc. The AI components could also include a large language model that robot 300 implements to communicate, to process data, etc. In some embodiments, an AI component may leverage external/third-party AI services to perform some of its functionality.

As an overview, AI-powered robots 300 can be leveraged as interactive mascots to provide a non-threatening yet highly effective means of monitoring and improving the school environment. The use of robots 300 can fill a gap in current school management systems by offering real-time, adaptive responses to a wide range of scenarios, from recognizing and rewarding positive behaviors to swiftly identifying potential security threats. Additionally, the use of robots 300 can contribute to students' social and emotional well-being, a crucial factor often overlooked in traditional security systems. Furthermore, by centralizing the management of robots 300 and providing clear protocols for human intervention, architecture 50 addresses the growing complexity of school administration, offering a solution that is both comprehensive and user-friendly. In short, architecture 50 transforms the challenge of school safety into an opportunity for creating a more positive, engaging, and secure educational experience for all students.

For example, architecture 50 can facilitate the management of complex scenarios such as behavior recognition and rewards, weapon detection, altercation detection, acoustic event monitoring, and unrecognized individual identification, among others. As described in detail below, this management is facilitated by providing a prompt management interface by which patrol instructions and specific detection protocols are sent to robots 300, receiving and processing alerts from robots 300, and coordinating appropriate responses based on the nature of the alerts. Notably, architecture 50 provides this functionality in a manner that is accessible to typical school administrators who do not have technical expertise.

Figure 4C:
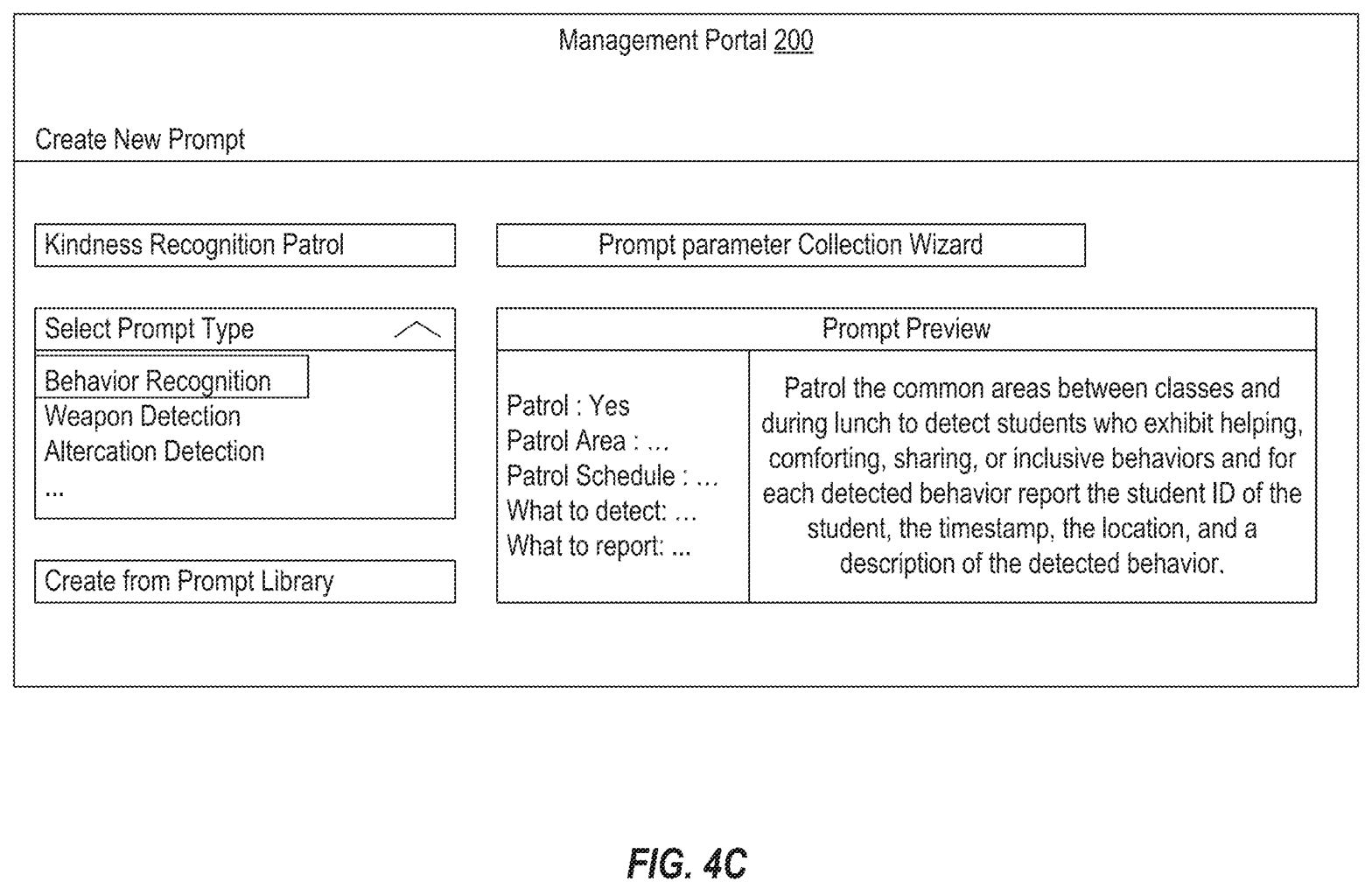

FIGS. 4A-4C provide an example of content and functionality management portal 200 may provide in one or more embodiments. These examples show how management portal 200 allows an administrator to create, edit, and manage prompts by which the administrator can configure one or more robots 300. In this context, the term "prompt" should be understood in the context of AI. For example, a prompt is textual content that can be provided to one or more robots 300 as instructions for the robot's AI component(s).

FIG. 4A represents a dashboard that may be presented to an administrator. This dashboard may identify active prompts (i.e., prompts that are currently active on one or more robots 300 that the administrator manages), provide a prompt scheduling interface (e.g., a calendar view of scheduled prompts), allow the administrator to create a new prompt or edit an existing prompt, and to view analytics or reports of prompts that robots 300 have executed, among possibly other things. In some embodiments, this dashboard or other portion of management portal 200 can provide a wide variety of functionality for facilitating the management of prompts including, for example, allowing batch editing, activation, or deactivation of prompts, generating logs of prompt creation, modification, activation, deactivation, etc., and generating reports representing prompt performance, prompt utilization, etc.

FIG. 4B provides an example of how management portal 200 (or management server 100 via management portal 200) may assist the administrator in creating a prompt. Management portal 200 can provide similar assistance for editing or otherwise managing prompts. As shown, management portal 200 can provide an option for the administrator to name/describe the prompt and to select the prompt type. In some embodiments, prompt types may be system defined. In some embodiments, administrators may be able to define prompt types. Based on the selected prompt type, a prompt parameter collection wizard can be executed to solicit user input from the administrator defining the desired parameters for the prompt. A prompt preview can also be provided which may be in the form of a side-by-side comparison of the user input and the prompt that was generated from the user input (e.g., using the AI components of management server 100). In some embodiments, management portal 200 may also maintain a prompt library containing predefined prompts that administrators can use, with or without modification.

FIG. 4C provides one example of how a prompt may be created via management portal 200. In this example, it is assumed that the administrator has selected behavior recognition as the type of prompt to be created. As a result, prompt parameter collection wizard could ask the administrator to identify whether the robot 300 should patrol (as opposed to remaining stationary), to identify the patrol area (e.g., common areas, certain classrooms, etc.) and the patrol schedule (e.g., during class, between classes, during lunch, before or after school, etc.), to identify what behavior the robot 300 should attempt to detect (e.g., whatever physical or verbal behaviors the administrator wants to detect), and to identify what/how the robot 300 should report a detection (e.g., the identity of the student(s) involved, the time and/or location, the type of behavior detected, etc.). FIG. 4C shows how management portal 200 can generate a textual prompt using the input parameters the administrator specifies, and this prompt can be provided to robot(s) 300. As can be seen, by automatically generating prompts from user input, management portal 200 frees the administrator from needing to understand the technical details for configuring robots 300.

A wide variety of prompt types can be implemented in architecture 50 including, for example, prompt types for detecting objects such as weapons, prompt types for detecting negative behavior such as altercations, improper language, bullying, etc., prompt types for detecting unknown individuals, prompt types for detecting audible events such as gun shots, and prompt types for detecting other positive behaviors.

The prompt library may contain a wide variety of predefined prompts that may be defined at differing levels of granularity. For example, the prompt library may include a first prompt for detecting kindness where the behaviors that are considered kindness are broadly/generally defined and a second prompt for detecting kindness where only kind words are considered kindness. Management portal 200 can allow the administrator to build custom prompts from such predefined prompts to further facilitate the configuration of robot(s) 300.

Figure 5:
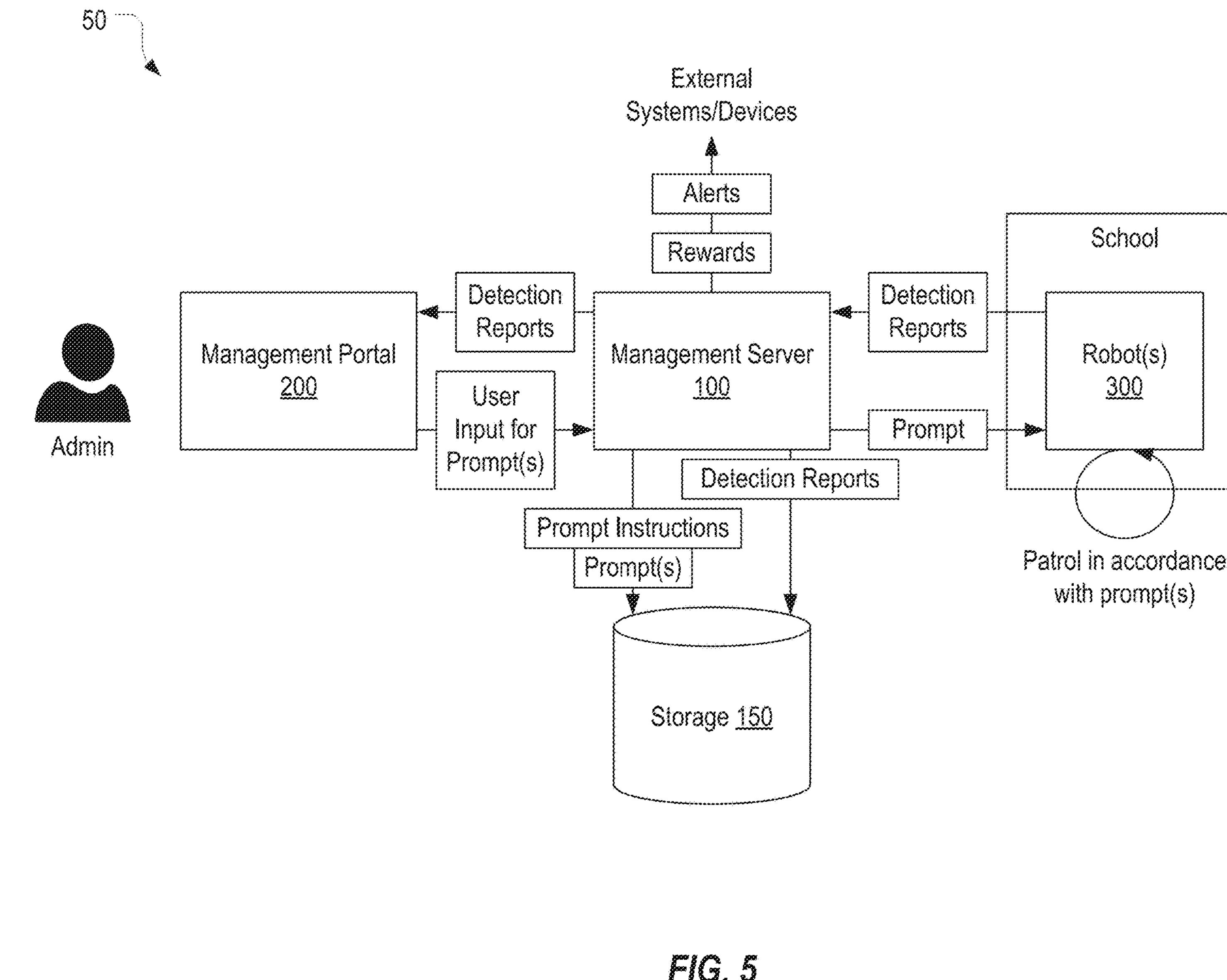
FIG. 5 provides an example of how an architecture for autonomous school safety robots with behavior reinforcement can be used in one or more embodiments.

FIG. 5 provides an example of how architecture 50 can be used to enhance school safety with behavioral reinforcement via robots 300. As shown, user input for creating prompts can be received at management portal 200. As represented in FIGS. 4B and 4C, management server 100 can create prompts from such user input and may store the prompts in storage 150. Management server 100 may also store any appropriate prompt instructions. For example, prompt instructions could include scheduling information (e.g., when or how often the prompt should be provided to robot(s) 300, which robot(s) 300 should receive the prompt, etc.). Management server 100 can also send these prompts to robot(s) 300 (e.g., directly or via a native API) to ensure that each robot's local store of active prompts is synchronized whenever the administrator creates a new prompt or edits an existing prompt. In some embodiments, management portal 200 could allow the administrator to immediately send (or activate) a prompt such as, for example, a prompt for patrolling the school to detect kindness behavior during an event or a prompt to patrol in response to an alert, and in such a case, management server 100 can immediately relay the prompt to the appropriate robot(s) 300 as opposed to following a defined schedule.

Each robot 300 that receives a prompt can patrol in accordance with the prompt. For example, a robot 300 receiving the prompt represented in FIG. 4C can leverage its AI components to navigate the common areas at the specified times. To do so, the AI component(s) can be aware of the school's bell schedule and any events and can be trained with the school's layout and with audio and/or video data indicative of the kindness behaviors to be detected. The AI component(s) can then process a feed from one or more cameras and/or microphones as robot 300 navigates the school (e.g., using a neural network, location data, etc.) to determine whether any of the kindness behaviors are detectable within the feed(s).

When the AI component(s) detect a behavior, occurrence, event, object, etc. (generally a "detectable occurrence") for which robot 300 is patrolling, they may generate and send a detection report (or alert) to management server 100. This detection report can be configured in accordance with the prompt and may include (or be sent with) one or more segments of the feed(s) in which the behavior was detected. These detection reports can be stored in storage 150 where they can be made accessible to the administrator via management portal 200. For example, management portal 200 could prompt the administrator to review the video, audio, and/or other sensor data from which robot 300 made the detection to confirm the accuracy of the detection, to adjust what was detected, to approve an action to be taken in response to the detection (e.g., to give a reward), etc. Management server 100 can use administrator feedback to build a database of labeled data (video snippets, audio snippets, sensor data, etc.) representing behaviors, objects, events, occurrences, etc. that it may be desirable to detect.

Depending on the type of prompt to which the detection report corresponds, management server 100 may also or alternatively interface with one or more external systems or devices upon receiving a detection report. For example, if the detection report corresponds to an altercation prompt, a weapon prompt, an unidentified individual prompt, or other type of safety-related prompt, management server 100 may immediately send an alert to defined recipients and/or devices (e.g., by pushing a notification to an application on the administrator's mobile device by which the administrator accesses management portal 200, by alerting the police, by activating an alarm in the school, etc.). As another example, if the detection report corresponds with a prompt for positive behavior, management server 100 may interface with a rewards system (e.g., RedCritter's CritterCoin system) to cause the student exhibiting the positive behavior to be rewarded.

FIGS. 6-9 provide examples of how architecture 50 facilitates the use of robots 300 to perform various detections in a school environment and how architecture 50 enables a wide variety of actions to be taken in response to detections, all in accordance with administrator defined/managed prompts. However, embodiments of architecture 50 should not be limited to such examples. To the contrary, architecture 50 enables an administrator to create and use prompts to cause robot(s) 300 to detect and report any reasonable behavior, object, event, occurrence, etc.

In some embodiments, examples of which are provided below, architecture 50 can enable administrators to enhance the ability of robots 300 to make a desired detection. For example, management portal 200 can present captured content (e.g., video, audio, and/or sensor data) to the administrator (e.g., as part of a detection report, as part of a general review, in conjunction with an administrator's creation of a prompt, etc.) and allow the administrator to label the content (or adjust an existing label) based on a behavior, object, event, occurrence, etc. present in the content. Management server 100 can maintain this labeled content/data and make it accessible to robots 300.

For example, an administrator can review video snippets captured by robots 300 as part of behavior recognition reports to determine if the desired good behavior is exhibited in the snippets. If a report is accurate (i.e., the video snippet shows a student exhibiting the behavior that the prompt was intended to cause robot 300 to detect), the administrator can confirm a label associated with (or add a label to) the video snippet. If the report is not accurate but the video snippet captures another type of good behavior that the administrator would like to reward, the administrator could associate an appropriate label with the video snippet so that this labeled content can be used by the AI components of robots 300 to detect the other type of good behavior.

In some embodiments, management portal 200 may allow the administrator to upload labeled content/data representative of a custom type of behavior, object, event, occurrence, etc. that the administrator would like robots 300 to detect. For example, if the administrator wants to create a prompt to cause robots 300 to detect when students say a school slogan, perform a school-specific gesture, perform a unique act of kindness, carry/wear a school-specific object, etc., the administrator could capture a video or audio of a student or other individual performing/exhibiting the desired action/object and upload it via management portal 200 along with a suitable label. Such labeled content could then be used to train the AI components of robots 300 to perform the desired detection. Then, as robots 300 send reports of such detections, the administrator could review and correct such reports to refine and enhance the accuracy of the labeled content.

Figure 6:
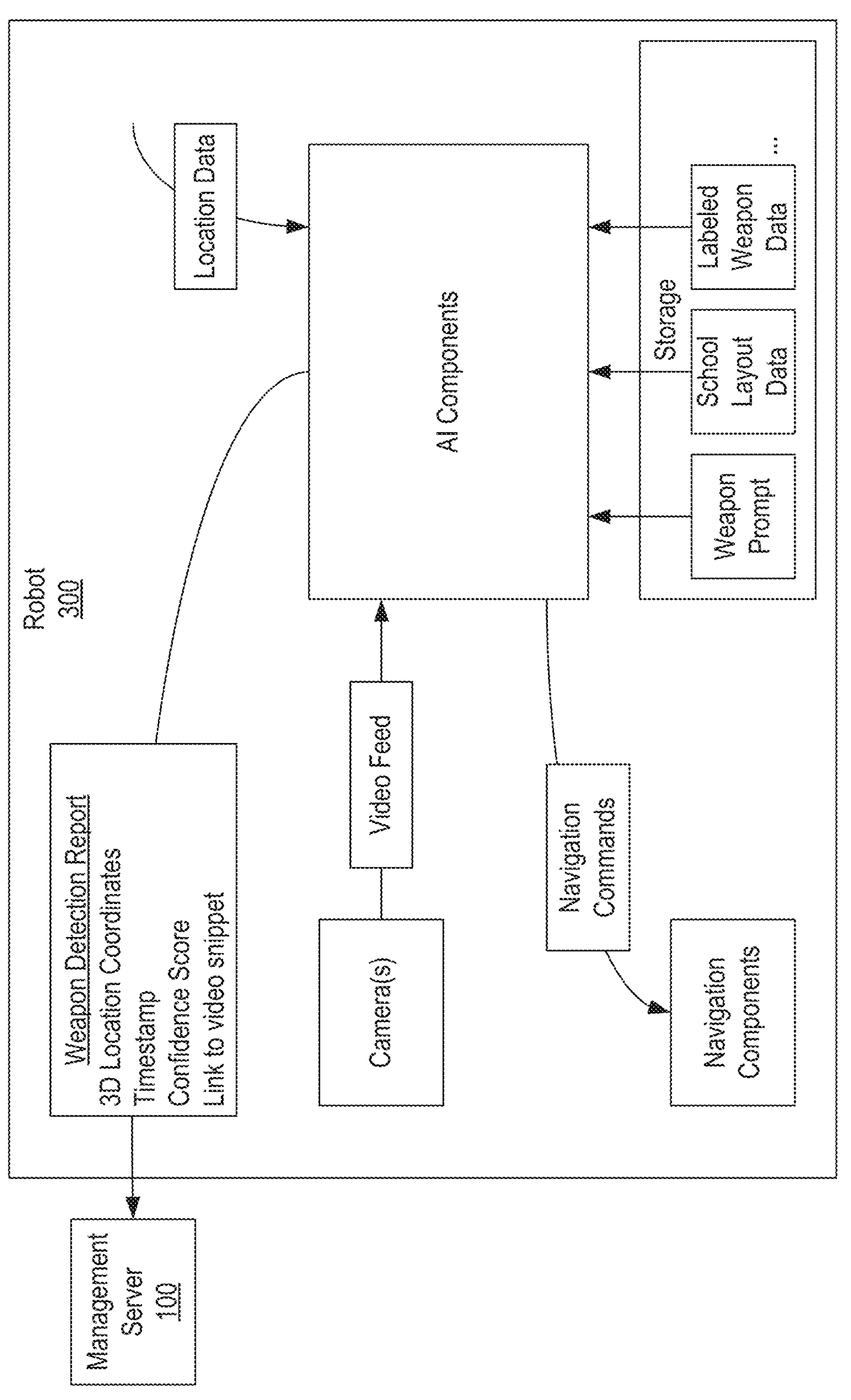
FIG. 6 provides an example of how a robot can be used to detect potential weapons in a school environment.

FIG. 6 provides an example of how a robot 300 can be used to detect potential weapons in a school environment. In this example, it is assumed that a weapon prompt has been provided to robot 300 and is stored in local storage. For example, this weapon prompt could be "Patrol the school including the hallways and parking lot, and if a weapon is spotted call this API {JSON API DEFINITION} through the Management Portal," which could have been generated from the administrator's input as described above. The JSON API definition can represent the instructions for configuring the weapon detection report/alert robot 300 should send.

In accordance with this prompt, robot 300 can patrol the school looking for weapons. For example, the AI components could be configured to use location data, school layout data, and/or the video feed to generate navigation commands for causing the navigation components to move robot 300 around the school including through the hallways and in the parking lot. As robot 300 navigates the school, the AI components can process the video feed using a neural network, a machine learning model and/or other suitable AI technique to determine whether a weapon is present in any portion of the video. Robot 300 (and/or management server 100) may store or have access to a collection of labeled weapon data that the AI components may use for this weapon detection process (e.g., to train a machine learning model by which the video feed is processed). If the AI components detect a weapon, they can generate and send a weapon detection report/alert as defined in the prompt. For example, the prompt could indicate that the report should provide 3D location coordinates and a timestamp for the detection, a confidence score for the detection, and a link to the snippet of video on which the detection is based. This report could then be immediately sent high priority to management server 100 for proper handling (e.g., to cause an alert to be sent to the administrator, other individuals, external systems, etc.).

In some embodiments, the AI components could be configured to implement facial recognition techniques in response to detecting a weapon to thereby identify an individual carrying the weapon and/or nearby individuals. For example, the AI components could control the camera to capture one or more images of the individual who was detected as carrying a weapon. In such cases, the report could also identify such individual(s).

In some embodiments, management portal 200 can provide mechanisms to allow an administrator to take swift action in response to confirming a weapon detection report. For example, when management portal 200 displays a weapon detection report to an administrator, it may also include an option to immediately send communications to teachers, students, parents, and/or authorities. In such cases, management server 100 can provide API integrations to the systems for sending such communications (e.g., API integrations with an email system, a text message system, a school application, a law enforcement system, etc.). As another example, management portal 200 may allow the administrator to take over control of robot 300 or to provide a specific prompt to cause robot 300 to search out and/or focus its camera(s) on the possible weapon. In any case, management server 100 can log all actions taken in response to the weapon detection report and can require administrator intervention to dismiss any raised alerts.

Figure 7:
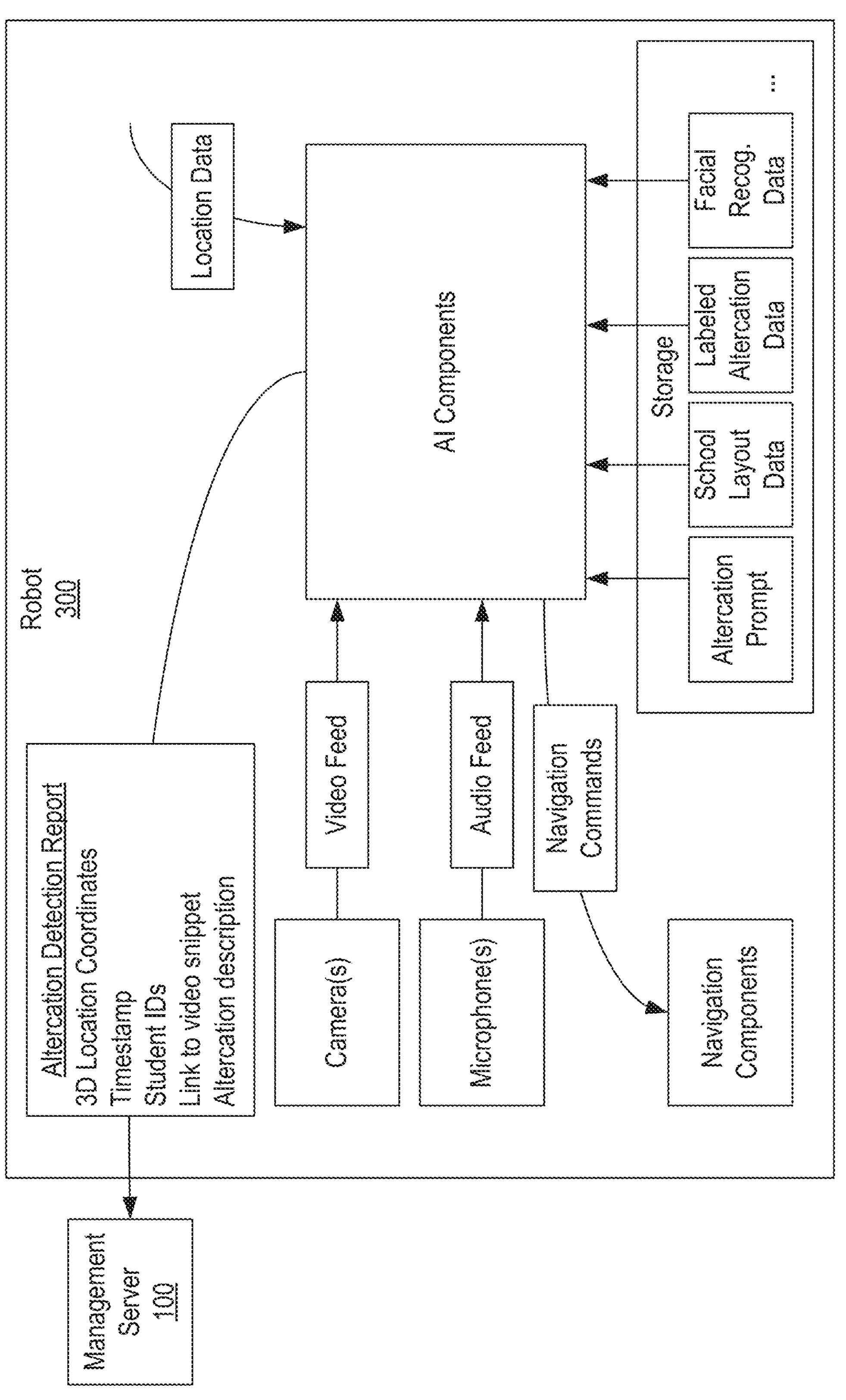
FIG. 7 provides an example of how a robot can be used to detect altercations in a school environment.

FIG. 7 provides an example of how a robot 300 can be used to detect altercations in a school environment. This example is generally similar to weapon detection and may involve a prompt such as "Patrol the school and monitor for potential altercations or conflicts between individuals. If detected, report with involved individuals'IDs and video evidence." Based on how the prompt is defined, the AI components of robot 300 may process an audio feed in addition to a video feed to determine if an altercation is occurring. For this purpose, robot 300 may store or have access to labeled altercation data that the AI components can use to determine whether the video and/or audio feeds capture aggressive body language, raised voices or shouting, physical contact between students, and/or unusual crowd gatherings.

If the AI components detect an altercation in the video and/or audio feed, robot 300 can begin capturing video and audio of the altercation. In other words, robot 300 can stop patrolling to focus the camera(s) on the students involved in the altercation. In conjunction with capturing the altercation, the AI components can perform facial recognition to identify the students and to obtain their IDs as instructed by the prompt. In some embodiments, the AI components can continue to process the video and/or audio to determine when the altercation has stopped, and in such cases, the AI components can automatically stop the video and audio capture. In any case, robot 300 can generate and send an altercation detection report in accordance with the prompt. For example, this report may identify the location and time of the altercation and the IDs of the involved students and may provide a link to the video and a description of the altercation. In some embodiments, this description can be generated by the AI components based on the video itself and can therefore quickly inform an administrator of the altercation without requiring the administrator to first review the video.

Management server 100 may respond to altercation detection reports in a similar manner as weapon detection reports. For example, management server 100 may send an alert and may provide an option via management portal 200 for the administrator to take immediate action if necessary. Management portal 200 may also provide an option, using its API integrations, to communicate with the parents of students involved, to schedule a meeting with the students and/or parents, to update the students'records, etc.

Figure 8:
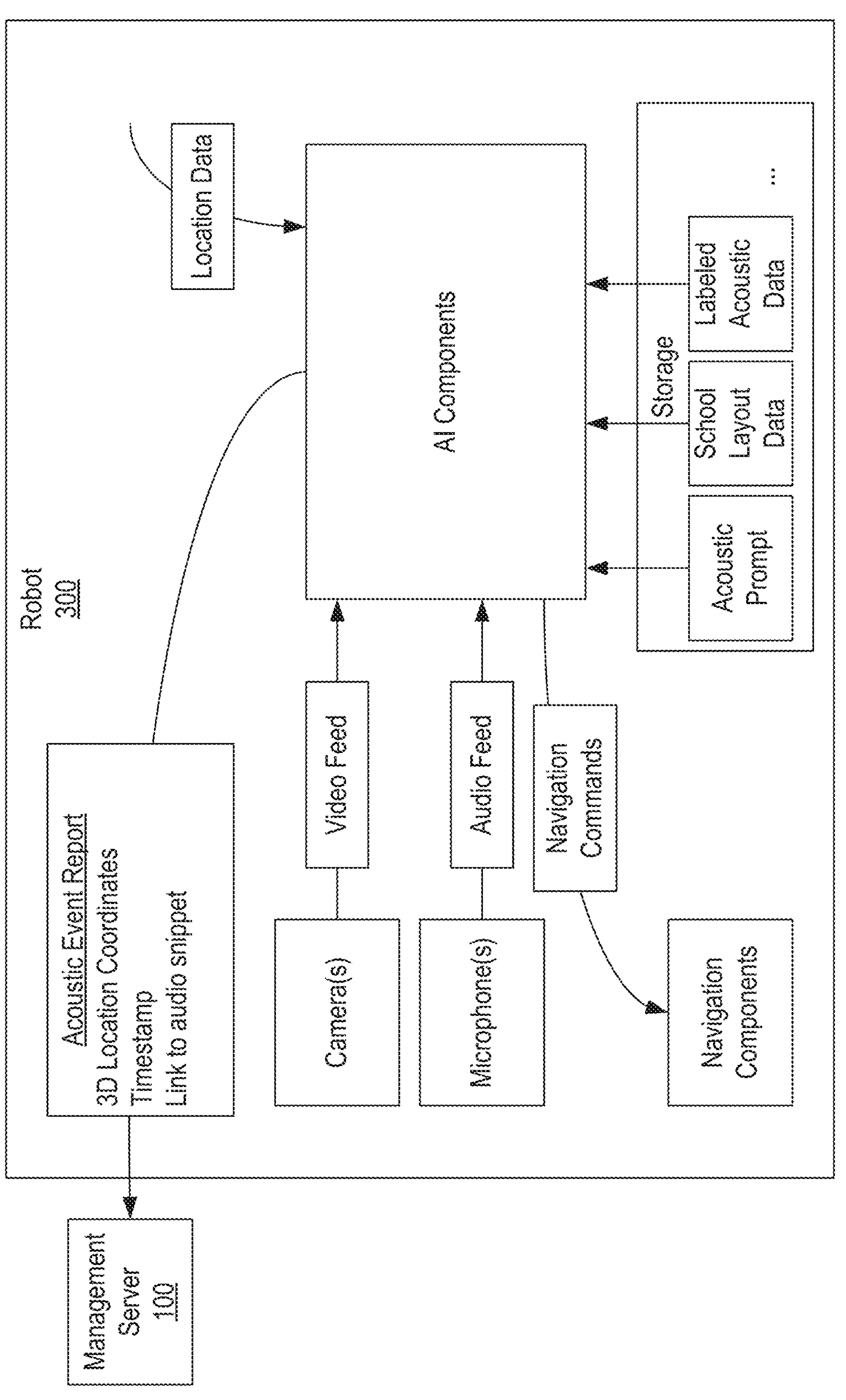
FIG. 8 provides an example of how a robot can be used to detect acoustic events in a school environment.

FIG. 8 provides an example of how a robot 300 can be used to detect acoustic events in a school environment. Given the similarities with the previous examples, a full description of acoustic event detection will not be provided. Suffice it to say that an acoustic prompt can instruct robot 300 to send an acoustic event report whenever the AI components determine that the audio feed includes an acoustic event. In some embodiments, the prompt may specify the specific type of acoustic event such as a gun shot. In some embodiments, the AI components may be trained to identify any acoustic event that is abnormal in a school environment. An abnormal acoustic event could be detected using labeled acoustic data and/or based on a decibel level of the acoustic event. As an example, an acoustic event report could identify the location and time of the detected acoustic event and may provide a link to an audio (or video) snippet containing the acoustic event.

When management server 100 receives an acoustic event report, it may respond in a similar manner as described above. For example, an alert can be raised and may prompt the administrator to review the report by listening to the audio snippet. If the acoustic event is a gunshot or other serious safety concern, management server 100 may immediately send alerts to security or law enforcement personnel and may allow the administrator to take immediate action such as in the manners described above. Management server 100 may also prompt the administrator to confirm the acoustic event or to reclassify it to improve the labeled acoustic data.

Figure 9:
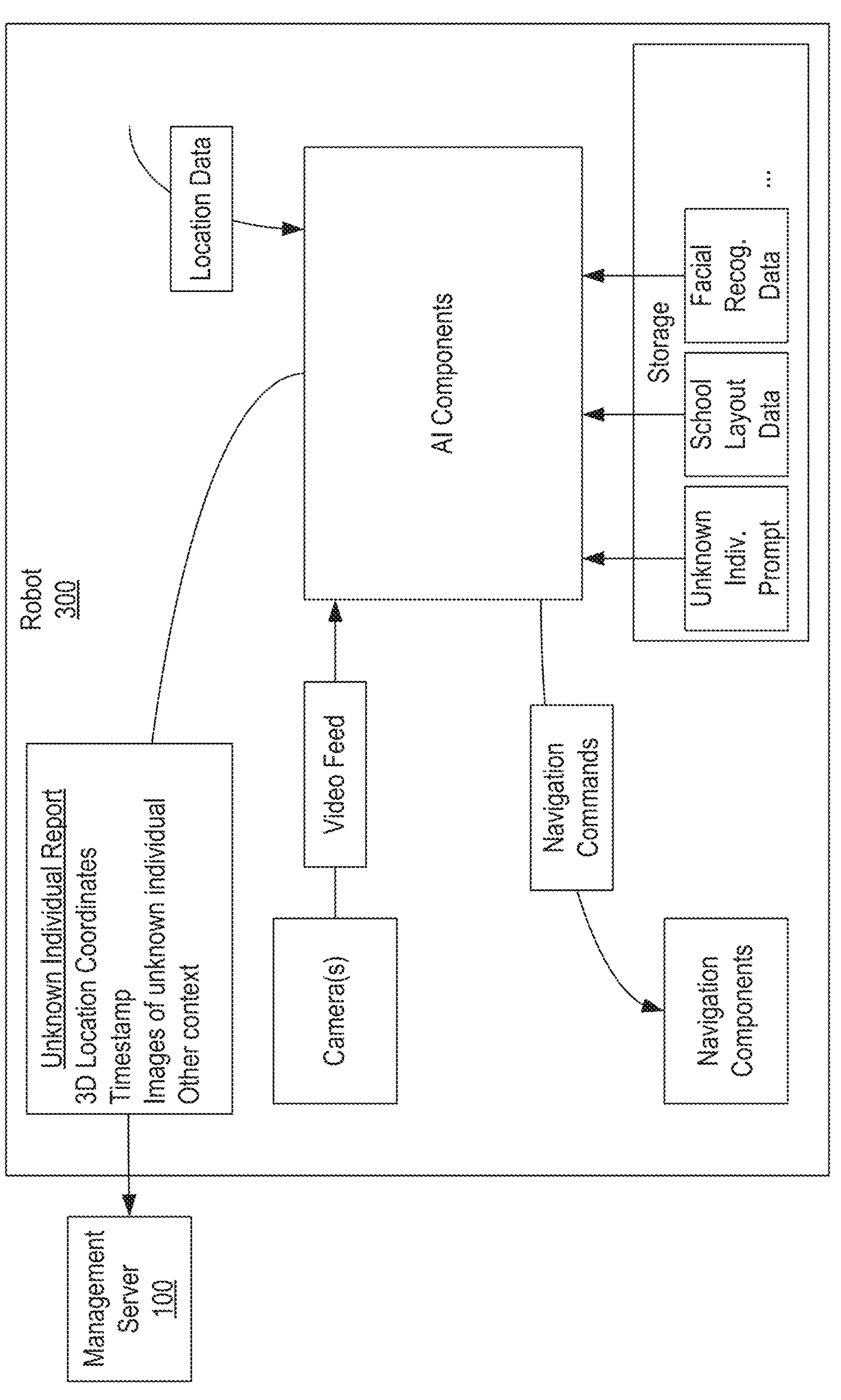
FIG. 9 provides an example of how a robot can be used to detect unknown individuals in a school environment.

FIG. 9 provides an example of how a robot 300 can be used to detect unknown individuals in a school environment. A prompt may instruct robot 300 to search for unknown individuals at a particular time and/or location within the school and/or may instruct how robot 300 should report any unknown individuals. In a similar manner as described above, the AI components of robot 300 can process the video feed to detect faces and can then use facial recognition data to attempt to identify each face. This facial recognition data could encompass students, teachers, staff, frequent/registered visitors, etc. If the AI components fail to recognize a detected face in the video feed, they can capture one or more clear images of the face and record the location and time (e.g., based on the prompt). This information, possibly along with additional context such as any event that may be occurring, can then be included in an unknown individual report sent to management server 100.

Management server 100 may generate an alert or otherwise make the unknown individual report available for review. In some embodiments, management portal 200 may allow an administrator to dismiss the alert if the individual is recognized and may allow input of the individual's name, role, authorization level, or other information for inclusion with the individual's image(s) in the facial recognition data. In this way, robot 300 can recognize the individual in subsequent encounters. In some embodiments, management portal 200 may allow the administrator to escalate the alert such as by raising an alarm, sending a communication to a security officer or the front office, or causing robot 300 to approach the individual for interaction. Such interaction could include greeting the individual, asking the individual if he or she needs assistance, requesting that the individual check in at the front office, etc. Robot 300 can continue to monitor the individual until the individual has been cleared.

In some embodiments, management server 100 may maintain a log of unknown individual reports which can be leveraged to analyze a school's visitor management process, to identify patterns in security incidents, to refine the facial recognition data, to track the frequency and resolution of unknown individual encounters, etc.

In some embodiments, management server 100 may maintain a unique set of data structures to facilitate the functionality described above. For example, a users data structure may be maintained for defining all users associated with a school. Each user could be defined using a unique ID, a role (e.g., admin, security, teacher, staff, student, etc.), first and last name, facial data for facial recognition (e.g., one or more images of the user), etc. A robots data structure and associated patrol data structures could also be maintained for identifying each robot in a school, defining patrol paths, logging patrols, etc.

A report (or alert) data structure may be maintained for tracking reports that have been generated within architecture 50. For example, a report could be defined using a unique ID, the ID of the robot that was the source of the alert, the type of the report/alert (e.g., weapon, altercation, unknown individual, acoustic event, etc.), a timestamp and location for the report, a status (e.g., new, under review, resolved, false alarm, etc.), and any resolution notes or resolution information.

A video snippets and/or audio snippets data structure may be maintained for storing video or audio snippets (or links) and associating such snippets with the report/alert to which they correspond. Various data structures may also be defined for specific types of reports/alerts. For example, a weapons data structure may be maintained for defining each time a weapon is detected such as by including an ID of the corresponding alert, an identifier of the detected weapon, and a confidence score for the detection. Similar data structures could be maintained for defining acoustic events, altercations, unrecognized individuals, etc. As another example, a kindness recognition data structure may be maintained for defining each time kindness is detected such as by including an ID of the type of kindness that was detected, ID(s) of the student(s) involved, the role of each involved student (e.g., initiator, recipient, witness, etc.), the time and location, etc.

A prompt data structure may be maintained for storing each prompt. For example, a prompt could be defined by identifying a unique ID, a type, a name, a description, the parameters input by the administrator, and the prompt generated from such input. Accordingly, a prompt could be edited by changing the parameters and regenerating the prompt from the changed parameters as opposed to modifying the prompt itself. A prompt schedule/assignment data structure(s) may be maintained for defining the schedule for executing each prompt such as by identifying the ID of the scheduled prompt, the start and end time for the prompt's execution, the recurrence (e.g., once, daily, weekly, monthly, etc.), which robot(s) the prompt is assigned to, etc.

In summary, the rise of technology in classrooms has created new opportunities for innovative solutions. Embodiments of the present disclosure address a critical need for a comprehensive, scalable, and intelligent system that can enhance school safety without compromising the welcoming atmosphere essential for learning.

Embodiments of the present disclosure may comprise or utilize special purpose or general-purpose computers including computer hardware, such as, for example, one or more processors and system memory. Embodiments within the scope of the present disclosure also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that embodiments of the present disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, smart watches, pagers, routers, switches, and the like.

Embodiments of the present disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present disclosure can be hosted in a cloud environment.

Embodiments of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing autonomous robots in a school environment, the method comprising:

providing, by a management server, a management portal to an administrator;

receiving, via the management portal, a selection of a prompt type:

based on the selected prompt type. executing a prompt-parameter collection wizard to receive user input from an administrator defining: (i) a particular type of detectable occurrence that one or more robots are to detect in the school environment, (ii) a patrol area, (iii) a patrol schedule, and (iv) information to be reported when the particular type of detectable occurrence is detected:

generating, by an AI module of the management server, a textual prompt based on the user input; and providing the textual prompt to one or more artificial intelligence components of the one or more robots to thereby cause the one or more robots to patrol the school environment for the particular type of detectable occurrence in accordance with the patrol area and the patrol schedule defined by the user input and to report the information defined by the user input when the particular type of detectable occurrence is detected.

2. The method of claim 1, wherein the particular type of detectable occurrence comprises a positive behavior exhibited by a student.

3. The method of claim 1, wherein the textual prompt is generated using artificial intelligence based on the user input.

4. The method of claim 1, further comprising:

receiving a detection report from a first robot of the one or more robots, the detection report indicating that the first robot detected the particular type of detectable occurrence, the detection report also including the information defined by the user input; and notifying the administrator of the detection report.

5. The method of claim 4, wherein the particular type of detectable occurrence is a positive behavior exhibited by a student, and wherein the information included in the detection report comprises an identification of the student and a video snippet that captured the positive behavior;

and further comprising providing a reward to the student based on the detection report.

6. The method of claim 4, wherein the particular type of detectable occurrence is an altercation between two or more students, and wherein the information included in the detection report comprises an identification of the students, a video snippet that captured the altercation and an artificial intelligence generated description of the altercation.

7. The method of claim 4, wherein the particular type of detectable occurrence is presence of a weapon, and wherein the information included in the detection report comprises a location of the detectable occurrence and one or more images or video of the weapon.

8. The method of claim 4, wherein the particular type of detectable occurrence is an acoustic event, and wherein the information included in the detection report comprises a location of the detectable occurrence and an audio snippet that captured the acoustic event.

9. The method of claim 4, wherein the particular type of detectable occurrence is presence of an unknown individual, and wherein the information included in the detection report comprises a location of the detectable occurrence and one or more images or video of the unknown individual.

10. The method of claim 4, further comprising:

in conjunction with the administrator reviewing the detection report via the management portal, providing, via the management portal, an interface for the administrator to control the first robot to further evaluate the detectable occurrence.

11. The method of claim 10, wherein the interface for the administrator to control the first robot to further evaluate the detectable occurrence includes one or more of the following:

an option to cause the first robot to interact with an individual when the particular type of detectable occurrence relates to the individual; or an option to cause the first robot to focus a camera on the particular type of detectable occurrence.

12. The method of claim 4, further comprising:

determining that the detection report represents a safety concern; and sending one or more alerts to one or more external systems.

13. The method of claim 12, wherein the one or more external systems comprise one or more of a communication system for communicating with students, teachers or parents, a law enforcement system, or an alarm system.

14. The method of claim 4, further comprising:

presenting, to the administrator, content capturing the particular type of detectable occurrence;

receiving, from the administrator, input that either confirms the particular type of detectable occurrence or identifies another type of detectable occurrence captured in the content; and labeling the content based on the input.

15. The method of claim 14, further comprising:

storing the labeled content as training data and using the labeled content to train the one or more artificial intelligence components of the one or more robots.

16. The method of claim 1, further comprising:

providing, by the management server, a library of predefined textual prompts, each predefined textual prompt being associated with at least one type of detectable occurrence;

receiving, from the administrator, selection of a particular predefined prompt in the library; and sending the particular predefined prompt to the one or more artificial intelligence components of at least one of the one or more robots to thereby cause the at least one of the one or more robots to patrol the school environment for the at least one type of detectable occurrence associated with the particular predefined prompt.

17. The method of claim 1, wherein the user input is received through a wizard that is dynamically configured based on the selected prompt type.

18. One or more non-transitory computer storage media storing computer executable instructions which when executed implement a method for providing autonomous robots in a school environment, the method comprising:

providing, by a management server. a management portal to an administrator:

receiving, via the management portal. a selection of a prompt type:

based on the selected prompt type. executing a prompt-parameter collection wizard to receive user input from an administrator defining: (i) a particular type of detectable occurrence that one or more robots are to detect in the school environment, (ii) a patrol area, (iii) a patrol schedule, and (iv) information to be reported when the particular type of detectable occurrence is detected;

generating, by an AI module of the management server. a textual prompt based on the user input; and providing the textual prompt to one or more artificial intelligence components of the one or more robots to thereby cause the one or more robots to patrol the school environment for the particular type of detectable occurrence in accordance with the patrol area and the patrol schedule defined by the user input and to report the information defined by the user input when the particular type of detectable occurrence is detected.

19. The one or more non-transitory computer storage media of claim 18, wherein the particular type of detectable occurrence comprises a positive behavior exhibited by a student.

20. An architecture for autonomous school safety robots with behavior reinforcement, the architecture comprising:

one or more robots deployed in a school environment, the one or more robots each including a camera, a microphone, and one or more AI components by which the robot patrols the school environment based on one or more prompts; and a management server that provides a management portal by which an administrator selects a prompt type and provides input via a prompt-parameter collection wizard, wherein the management server generates, using artificial intelligence, a textual prompt based on the input and provides the textual prompt to the one or more robots, the textual prompt including patrol instructions and reporting instructions, wherein the one or more robots patrol the school environment based on the textual prompt and generate detection reports in accordance with the reporting instructions.

* * * * *